Sept. 22, 1925.
A. M. ROMITI
SHOE REPAIRING PRICE INDICATOR
Filed June 28, 1923
1,554,762
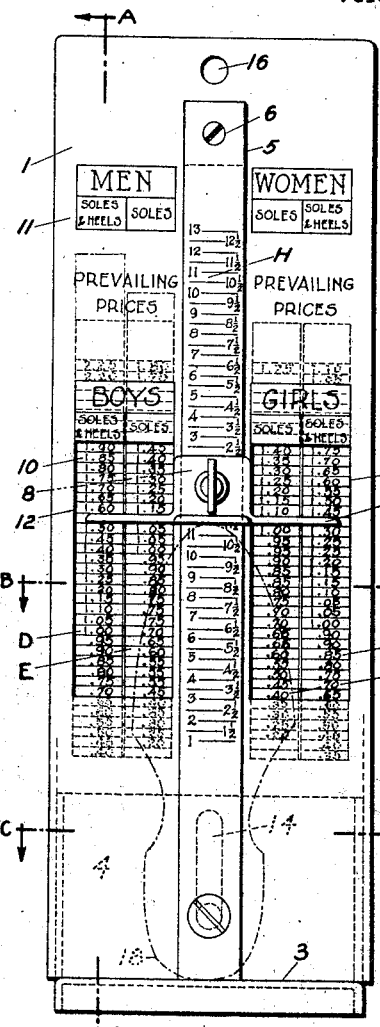
Fig. 1
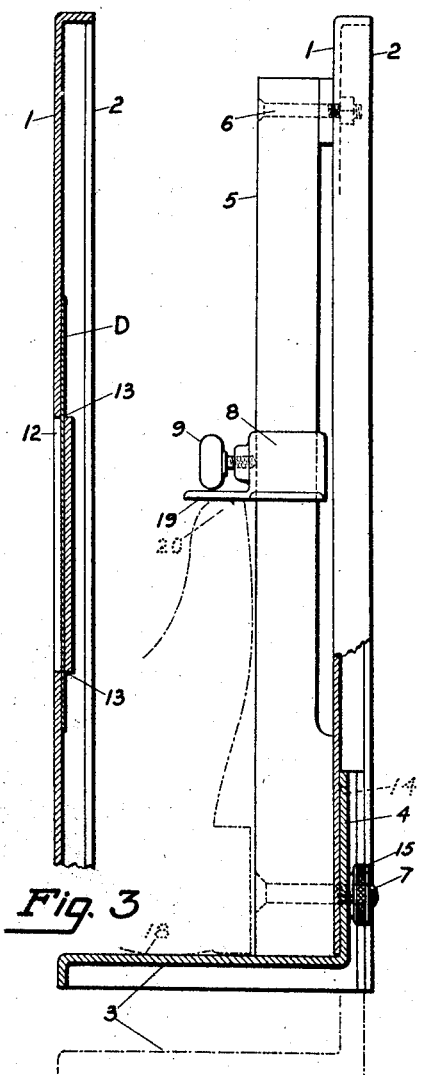
Fig. 3
Fig. 2
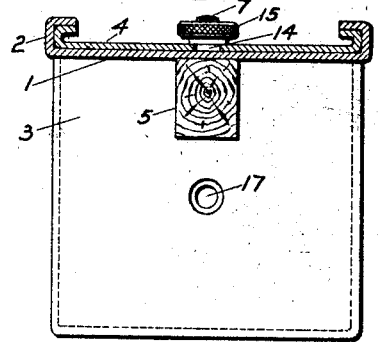
Fig. 5
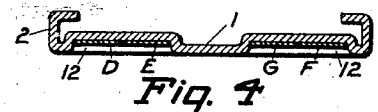
Fig. 4
INVENTOR.
Anton M. Romiti
BY M. C. Frank
ATTORNEY.

Patented Sept. 22, 1925.

1,554,762

UNITED STATES PATENT OFFICE.

ANTON M. ROMITI, OF OAKLAND, CALIFORNIA.

SHOE-REPAIRING PRICE INDICATOR.

Application filed June 28, 1923. Serial No. 648,179.

*To all whom it may concern:*

Be it known that I, ANTON M. ROMITI, a citizen of the United States, residing at Oakland, in the county of Alameda and State of California, have invented certain new and useful Improvements in Shoe-Repairing Price Indicators, of which the following is a specification.

My invention relates to footwear measuring instruments, and more especially to shoe-repairing price-indicators.

The device is intended, primarily, to be used by shoemakers and such retail shoe stores that do shoe-repairing, for the purpose of determining the price of the repaired shoes. Also it is to be used to measure the foot to determine the proper last upon which to repair or reconstruct the shoe, or to determine the size of new shoe required for the foot measured, as the size of the shoe printed in the uppers are worn off frequently, or the manufacturer's code size may not be understood.

Shoemakers experience a difficulty in determining the prices to charge for repairing shoes, and more particularly children's shoes, because the latter shoes include all lengths from those of small to large children, while adults' shoes are not subject to the great variations in length, hence, it is difficult to establish a fixed price for repairing children's shoes, having in view fairness to the shoemaker and also to the child. Again, boys and girls having the same length of shoe require different grades of leather and workmanship, and accordingly the repair prices should be different, so the chief object of my invention is to establish price charts that will impartially, visibly and definitely indicate the repair price by shoe-length measure alone, thus, eliminating all heretofore price discrepancies in shoe repairing.

Another object is the provision of the device as a separate article of manufacture, tending to establish amongst shoemakers uniform prices for their respective districts.

And another object is to have the instrument adjustable for a flat decrease or increase in price, and also have the price scales adjustable individually for labor or material market fluctuations.

A further object is to provide the instrument with an additional chart for indicating directly the size shoe required for the foot measured, and also by measuring the said shoe in a similar manner, to state the expectant price for repairing the shoe.

Other objects and advantages, and the features of construction of the invention, will appear in the subjoined description of the accompanying sheet of drawings, in which:

Figure 1 is a face view of an indicator constructed in accordance with my invention, and shows a shoe whose length has been determined, the repair charge for the same being readable on the proper scale of the chart.

Fig. 2 is a side view of Fig. 1 with part of the structure broken away, to show some of the details of construction. In dotted lines the base is shown extended.

Fig. 3 is a sectional elevation of part of Fig. 1 taken on the line A—A, and shows a price scale in position.

Fig. 4 is a transverse section through the frame and scales on the line B—B of Fig. 1, and Fig. 5 is a sectional plan of the indicator on the line C—C.

Adverting to the drawing and figures thereof: The numeral 1 throughout the figures represents the frame of the indicator, and is preferably of sheet-metal formed with flanges 2 along its borders for finish and rigidity. At the lower end of the frame the flange has been omitted, to permit a base 3 similarly flanged to slidably engage the frame thereat.

The base is right-angled in formation, the vertical leg 4 thereof engaging the frame as shown clearly in Fig. 2. The horizontal leg of the base is of sufficient size to support the indicator in a vertical position. Also the latter leg is the base-position or heel-rest from which measurements are begun.

Mounted on the face of the frame is a guide 5 in the form of a bar, and is of wood or other suitable material, and attached to the frame as by bolts 6 and 7. The guide is spaced from the face of the frame 1 intermediate its ends, to accommodate a movable member 8 on the guide between the said ends.

The member 8 may be of cast material and in the form of an armed-slide or spider, and is adapted to be adjustably positioned and held on the guide 5 by the thumb-screw 9.

On the face of the guide is a chart H, bearing two sets of numbers 1 to 13, laid off to a certain scale and from the definite position of the base 3 as shown in Fig. 1. The lower set of numbers represent the sizes of children's shoes, and the upper set that of adults' shoes.

On the face of the frame 1 is a visible price chart denoted in general by the numeral 10, while 11 represents other indicia relating to repair prices for men's and women's shoes.

The chart 10 as shown, consists of a series of scales D, E, F and G of celluloid or other suitable material, having numbers printed thereon in accordance with a definite plan of price classification. The longitudinal column D denotes the prices for soling and heeling boys' shoes, and column E for soling only. Similarly, columns F and G denote the repair prices for girls' shoes.

The scales are supported by the frame 1 in depressions 12 formed thereon, Figs. 1 and 4, and having open ends 13, Fig. 3, for extending the scales therethrough, and for individual scale adjustment as shown by the light dot-and-dash lines at the top of scales D and E. The scales are of such width and thickness as to be snugly retained in the depressions by their close fit.

Bolt 7 is fixed in guide-bar 5, but the vertical leg 4 of the base 3 has a longitudinal slot 14, for permitting the said base to be extended for a purpose to be presently set forth, and the knurled nut 15 is for clamping the base and frame together as a unit for the adjusted position.

16 is a hole for hanging the indicator at any chosen place, and 17 a hole in the base should it be desired to secure it to a support.

In use, the shoemaker purchasing an indicator, will set the scales D, E, F and G, individually to the prevailing repair prices in his district and consider the scale arrangement fixed; the scales being set with respect to the base 3 being positioned at its normal unextended position as shown in Fig. 1, because this is the base position for the foot measure with respect to chart H.

With the base in its normal position, as stated, and the price of a repaired shoe desired, one places the heel 18 of the shoe on the base and the sole thereof against the guide 5, and lowers the armed-slide 8 until the toe-arm 19 thereof touches the toe 20, and a glance to the right in line with the lower surface of the right arm 21, will indicate in the proper column the charge price of the repaired shoe if it is a girl's, and likewise to the left if it is a boy's shoe.

Should the labor and material market drop in price, then the base 3 can be extended in proportion, as shown in dotted lines Fig. 2, without disturbing the set scales, by means of the bolt 7 and nut 15. But if only one factor varied, that of skilled labor on soling for example, then the scales E and G can be reset without disturbing the base or other scales. This particular adjustment would give an incorrect reading on the size of the shoe, but since the price scales would be correct for the drop in cost the adjustment could still be used to advantage.

Since the lengths of adults' shoes are quite constant, and not subject to the great variations as compared to children's shoes, I have left blank spaces under the indicia "Prevailing prices" for the hand-printing thereon by the shoemaker of the local prices for adults' shoe-repairing.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired, as fall within the scope of the appended claim.

Having thus described my invention, what I claim as new and desire to secure by Letters Patent of the United States, is the following:

A shoe repairing price-indicator having in combination, a frame embodying a heel-rest base, a guide bar rigidly secured to said frame and provided with a shoe-size indicating scale, price indicating scales carried by said frame adjacent said shoe-size indicating scale, an indicator slidable lengthwise on said guide bar and adapted to co-operate with said heel-rest base in measuring a shoe, means for indicating the corresponding repair price on said price indicating scales and means for adjusting the position of said price indicating scales relative to said heel-rest base.

In testimony whereof I affix my signature.

ANTON M. ROMITI.